(12) United States Patent
Li et al.

(10) Patent No.: US 9,785,672 B2
(45) Date of Patent: Oct. 10, 2017

(54) INFORMATION SEARCHING METHOD AND DEVICE

(71) Applicant: BEIJING BAIDU NETCOM SCIENCE AND TECHNOLOGY CO., LTD., Beijing (CN)

(72) Inventors: Tingting Li, Beijing (CN); Wei Wan, Beijing (CN); Shiqi Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 391 days.

(21) Appl. No.: 14/575,364

(22) Filed: Dec. 18, 2014

(65) Prior Publication Data
US 2015/0293970 A1 Oct. 15, 2015

(30) Foreign Application Priority Data

Apr. 10, 2014 (CN) .......................... 2014 1 0144036

(51) Int. Cl.
G06F 17/30 (2006.01)
(52) U.S. Cl.
CPC .... G06F 17/30445 (2013.01); G06F 17/3064 (2013.01); G06F 17/30554 (2013.01); G06F 17/30654 (2013.01)
(58) Field of Classification Search
CPC .......... G06F 17/3064; G06F 17/30654; G06F 17/2785; G06F 17/30684; G06F 17/27; G06F 17/271; G06F 17/2735; G06F 17/30528; G06F 17/3053; G06F 17/3061; G06F 17/30657; G06F 17/30663; G06F 17/30672; G06F 17/30705; G06F 3/04842; G09B 7/12; G06N 5/02

USPC ................. 707/722, 999.003, E17.068, 765, 707/E17.014, E17.058, E17.069, E17.071, 707/E17.078, E17.084, 766, 771, 707/999.005; 704/9
See application file for complete search history.

(56) References Cited

U.S. PATENT DOCUMENTS 5,715,468 A * 2/1998 Budzinski ............... G06F 17/27
704/9
9,367,608 B1 * 6/2016 Zhang ............... G06F 17/30657
(Continued)

FOREIGN PATENT DOCUMENTS

CN 102456018 A 5/2012
CN 102982023 A 3/2013
(Continued)

OTHER PUBLICATIONS

Yoon et al., Intent-Based Categorization of Search Results Using Questions from Web Q&A Corpus, WISE 2009, Lecture Notes in Computer Science, vol. 5802, pp. 145-158. Jan. 1, 2009.

Primary Examiner — Dennis Truong
(74) Attorney, Agent, or Firm — Hodgson Russ LLP

(57) ABSTRACT

An information searching method and an information searching device are provided. The information searching method includes: receiving, at one or more computing devices, a first query from a client device, and obtaining, at the one or more computing devices an intention clarification guidance sentence according to the first query; receiving a second query updated according to the intention clarification guidance sentence; obtaining a search result according to the second query; and returning the search result to the client device.

15 Claims, 6 Drawing Sheets

(56) References Cited

U.S. PATENT DOCUMENTS

| | | | |
|---|---|---|---|
| 2001/0053968 A1* | 12/2001 | Galitsky | G06F 17/30722 704/9 |
| 2007/0022099 A1* | 1/2007 | Yoshimura | G06F 17/30654 |
| 2007/0050374 A1* | 3/2007 | Zhao | G06F 17/30654 |
| 2007/0294122 A1 | 12/2007 | Johnston | |
| 2010/0145976 A1* | 6/2010 | Higgins | G06F 17/3064 707/765 |
| 2011/0270607 A1* | 11/2011 | Zuev | G06F 17/27 704/9 |
| 2012/0303356 A1* | 11/2012 | Boyle | G06F 17/30672 704/9 |
| 2013/0288219 A1* | 10/2013 | Dheap | G09B 7/12 434/350 |
| 2015/0058329 A1* | 2/2015 | Cook | G06N 5/02 707/723 |
| 2015/0161241 A1* | 6/2015 | Haggar | G06F 17/30654 707/723 |

FOREIGN PATENT DOCUMENTS

| | | |
|---|---|---|
| CN | 103544267 A | 1/2014 |
| CN | 103678358 A | 3/2014 |
| JP | 2006107520 A | 4/2006 |
| JP | 2012068985 A | 4/2012 |
| JP | 2013143066 A | 7/2013 |
| JP | 2014092822 A | 5/2014 |
| JP | 2014112316 A | 6/2014 |
| WO | 2013010262 A1 | 1/2013 |
| WO | 2014022345 A2 | 2/2014 |

* cited by examiner

Fig. 5

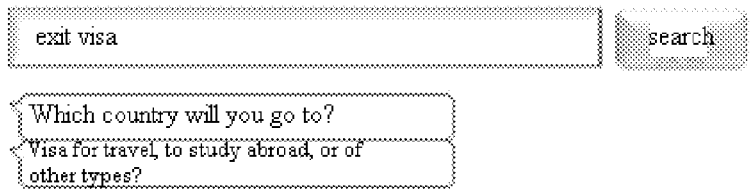

what is the flowchart of applying an exit visa? Baidu Kowns
5 answers - questioning time: May 7, 2011
Best answer: general flow chart for exit visa: determine type of visa→prepare application materials →submit application materials to consulate→wait→get visa. The key point is preparing required application materials, is ...
zhidao.baidu.com/link?url=ZdONgqXmtAjFlV2... 2011-5-17

How much does it cost to apply an exit visa?-solved-Search Ask
2 answers-Latest answer: September 19, 2008
Question description: To Japan...Does it take long?
Best answer: it depends on the type of visa. Beijing-Japan visa is generally prepared by an agency, a normal business visa costs 450RMB and takes 5 work days, while an urgent visa costs 660RMB and takes 3 work days, Chongqing...
wenwen.soso.com/z/q367167...htm 2013-10-10 -Baidu Snapshot Guideline for applying exit visa-Huize Insurance Net
Introductions of application materials and applying process of exit visa, and essential preparations during the application process....The most complete guideline and strategy for applying exit visa, maps for applying exit visa, buy insurance online, full refund if refused. Electronic insurance policy...
www.hzins.com/special/v... 2011-08-19 - Baidu Snapshot

Fig. 6(a)

[ England travel visa ] [search]

Which material is needed for applying an England individual travel visa? Baidu Knows
2 answers-Questioning time: July 20, 2012
Best answer: basic materials for applying travel visa are as follows:1.passport; 2.passport photo (recent photo within latest 6 months); 3.employment certificate; 4. salary certificate; 5. leave certificate; 6.bank statement within 6 months (capital amount depends on the time you will stay in England...
zhidao.baidu.com/link?url=UE9MRZqZ84377... 2012-8-4
Expiry term of England travel visa    4 answers    2012-09-10
How to apply England travel visa?    2 answers    2008-09-16
Which procedure needs to handle
to apply an England travel visa for
an individual?    2 answers    2008-09-24
More knows related questions>>
Guideline for applying England visa  Baidu Experience I want to apply: personal travel  Business  Family visit  Normal student  Child student

| special tips | application procedure | required materials | quick service | application place and deadline |

Guideline for applying England individual travel visa [full text information]
*special tips 1. Make advanced reservation before going to England Visa Application Center to make applications. Submitting applications without making an advanced reservation will not be handled by the Application Center.
2. The Application center will collect fingerprint. If you have a wound in the hand, please make reservations after the wound is healed. Make sure your hands has no tattoos (or similar cases) when visiting the Visa Application Center.

Fig. 6(b)

INFORMATION SEARCHING METHOD AND DEVICE

CROSS REFERENCE TO RELATED APPLICATION

This application claims priority and benefits of Chinese Patent Application No. 201410144036.7, filed with State Intellectual Property Office on Apr. 10, 2014, the entire content of which is incorporated herein by reference.

FIELD

Embodiments of the present disclosure generally relate to a computer networking technology field, and more particularly to an information searching method and an information searching device.

BACKGROUND

With a development of the computer technology, internet applications become more and more popular and a user can obtain internet resources that he needs through a search engine. Currently, in a related searching method, the user inputs a query firstly, and the search engine obtains a search result associated with the query and returns the search result to the client, and the user obtains the resource that he needs from the returned search result finally.

However, according to the above searching method, an accurate answer cannot be provided by the search engine due to an unclear or incomplete expression of the query input by the user. Even provided with same resources, since the user is not familiar with a field to which the query belongs, it is required for the user to change the query many times to perform a search, and thus a searching cost is dramatically high, but even so the obtained search result still cannot satisfy a requirement of the user.

SUMMARY

Embodiments of the present disclosure seek to solve at least one of the problems existing in the related art to at least some extent.

Accordingly, a first objective of the present disclosure is to provide a computer-implemented information searching method, which can guide and clarity a search intention of the user, improve an accuracy of a search engine to identify the searching intention of the user, satisfy requirements of the user, and improve the user experience.

A second objective of the present disclosure is to provide an information searching device.

In order to achieve above objectives, embodiments of a first aspect of the present disclosure provides an information searching method. The information searching method according to embodiments of the present disclosure includes: receiving, at one or more computing devices, a first query from a client device; obtaining, at the one or more computing devices, an intention clarification guidance sentence according to the first query; receiving a second query updated according to the intention clarification guidance sentence; obtaining a search result according to the second query; and returning the search result to the client device.

With the information searching method according to embodiments of the present disclosure, the intention clarification guidance sentence provided by the search engine is obtained, and the first query is updated according to the intention clarification guidance sentence, and the search result is provided according to the updated query such as the second query, such that the search intention of the user is clarified. Therefore, an accuracy of the search engine to identify the search intention of the user is increased and requirements of the user are satisfied, and in this way a user experience is improved.

Embodiments of a second aspect of the present disclosure provide an information searching device. The information searching device according to embodiments of the present disclosure includes: one or more computing devices configured to execute one or more software modules, the one or more software modules including: a first obtaining module configured to receive a first query and to obtain an intention clarification guidance sentence according to the first query; a second obtaining module configured to receive a second query updated according to the intention clarification guidance sentence, and to obtain a search result according to the second query; and a returning module configured to return the search result.

With the information searching device according to embodiments of the present disclosure, the intention clarification guidance sentence provided by the search engine is obtained, and the first query is updated according to the intention clarification guidance sentence, and the search result is provided according to the updated query such as the second query, such that the search intention of the user is clarified. Therefore, an accuracy of the search engine to identify the search intention of the user is increased and requirements of the user are satisfied, and in this way a user experience is improved.

Embodiments of a third aspect of the present disclosure provide a non-transitory computer readable storage medium. The non-transitory computer readable storage medium includes a computer program for executing the information searching method according to embodiments of the first aspect of the present disclosure, when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which:

FIG. 5 is a schematic diagram showing an effect of obtaining an interactive sentence pair based on community-based Q&A resource in an information searching method according to an embodiment of the present disclosure;

FIG. 6(a) is a schematic diagram showing an effect of obtaining an intention clarification guidance sentence in an information searching method according to an embodiment of the present disclosure;

FIG. 6(b) is a schematic diagram showing an effect of obtaining a search result according to a second query updated according to the intention clarification guidance sentence in an information searching method according to an embodiment of the present disclosure.

DETAILED DESCRIPTION

Figure 1:
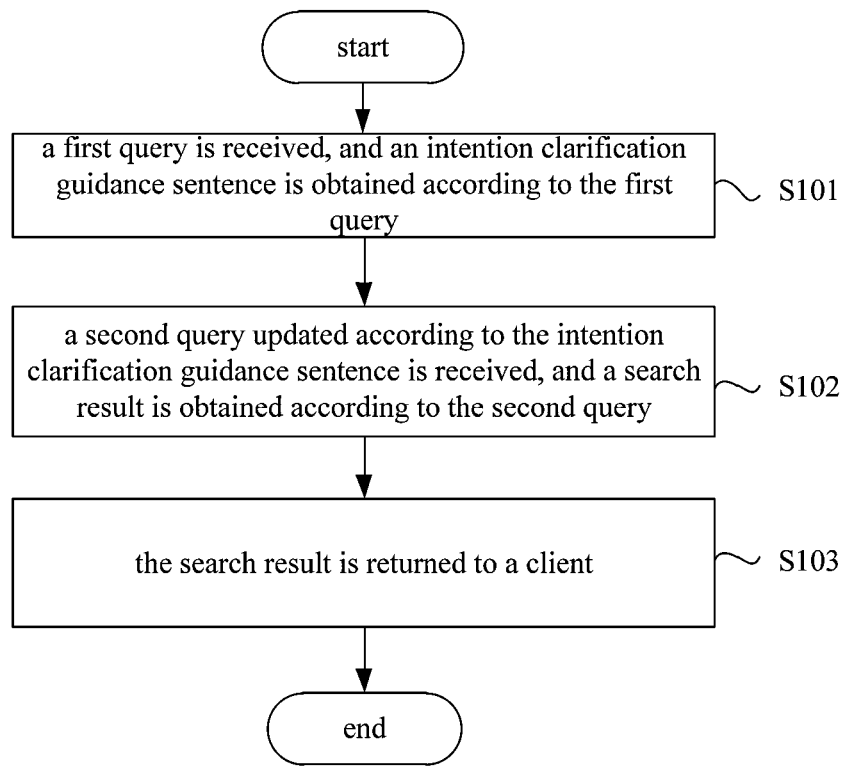
FIG. 1 is a flow chart showing an information searching method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

FIG. 1 is a flow chart showing an information searching method according to an embodiment of the present disclosure. As shown in FIG. 1, the information searching method includes following steps.

At step S101, a first query is received, and an intention clarification guidance sentence is obtained according to the first query.

In some embodiments of the present disclosure, the first query may include a term or a sentence. A sentence library may be established before the intention clarification guidance sentence is obtained according to the first query, such that a search engine may search the sentence library to obtain the intention clarification guidance sentence. In some embodiments, the step of establishing the sentence library may be avoided if the sentence library has been pre-established.

At step S102, a second query updated according to the intention clarification guidance sentence is received, and a search result is obtained according to the second query.

In some embodiments of the present disclosure, the search engine may obtain the second query updated according to the intention clarification guidance sentence and obtain the search result according to the second query. For example, the search engine may display the intention clarification guidance sentence to the user via a client, and the user may input an updated query (for example, the second query) in an input box provided by the search engine, and then the search engine may search according to the updated query and obtain a search result.

At step S103, the search result is returned to a client.

In some embodiments of the present disclosure, after obtaining the search result, the search engine may return the search result to the client and display the search result to the user. The user may obtain resources he or she needs based on the displayed search result.

Figure 2:
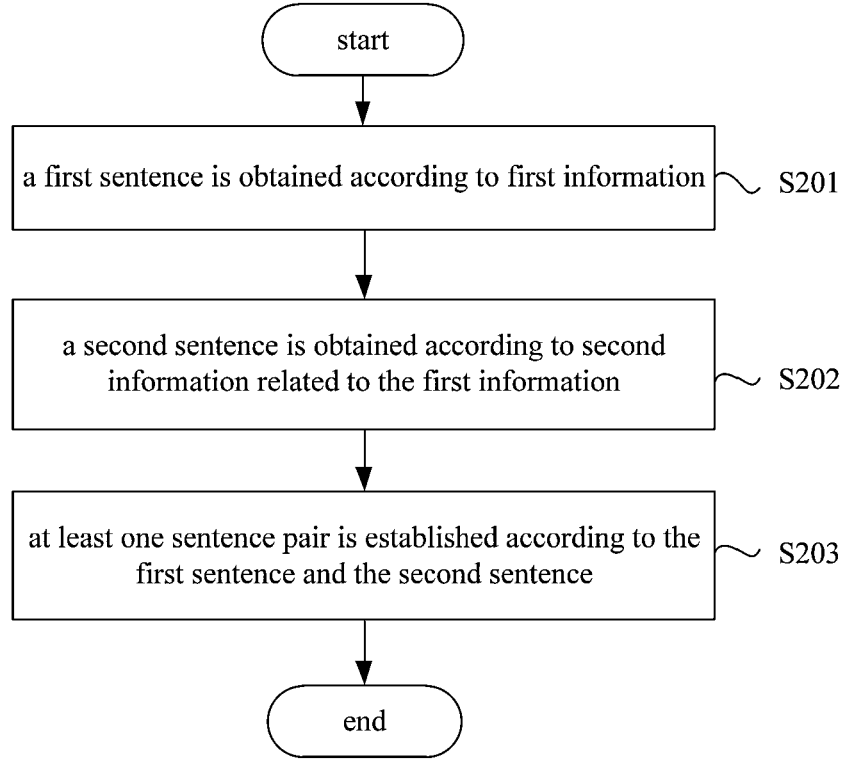
FIG. 2 is a flow chart showing establishing a sentence library in an information searching method according to an embodiment of the present disclosure.

As described above, the information searching method further includes establishing a sentence library. In some embodiments of the present disclosure, as shown in FIG. 2, establishing a sentence library includes following steps.

At step S201, a first sentence is obtained according to first information.

In some embodiments of the present disclosure, the search engine may divide the first information, and detect whether the first information belongs to a preset sentence type according to a preset feature. If the first information belongs to the preset sentence type, the first sentence is obtained according to the first information. In some embodiments of the present disclosure, the first information may include sentences in a knowledge exchanging platform of community users, the preset sentence type may include various questions, and the preset feature may include an interrogative dictionary or a question feature.

At step S202, a second sentence is obtained according to second information related to the first information.

In some embodiments of the present disclosure, the search engine may divide the second information, and detect whether the second information belongs to a preset sentence type according to a preset feature. If the second information belongs to the preset sentence type, the second sentence may be obtained according to the second information, in which the second information is related to the first information.

At step S203, at least one sentence pair in the sentence library is established according to the first sentence and the second sentence.

In some embodiments of the present disclosure, the search engine may establish at least one sentence pair according to the first and second sentences after obtaining the first and second sentences, and store the sentence pair in the sentence library so as to establish or expand the sentence library.

In some embodiments of the present disclosure, the search engine may search resources in the knowledge exchanging platform of community users, which resources include a plurality of questions (the first information) provided by users and answers (the second information) to these questions provided by other users. After determining that both the questions and answers belong to the preset sentence type, the search engine may obtain a sentence pair consisting of at least one question (the first sentence) and a corresponding answer (the second sentence), thus establishing the sentence library. For example, a user asks a question "what to do if a baby has a fever of 38.5° C." in "Baidu Knows", and another user provides an answer "it depends on how old the baby is". The search engine may obtain a sentence pair consisting of this question and this answer and store the sentence pair in the sentence library, thus establishing or expanding the sentence library.

In some embodiments of the present disclosure, the search engine may filter the sentence pair in the sentence library, after establishing the at least one sentence pair in the sentence library. In some embodiments of the present disclosure, the second sentence in the sentence library is filtered according to a preset filtering rule. For example, a first sentence "interesting places to travel on October 1st" and a second sentence "which place is interesting on October 1st" have similar semantics and belong to a same question, and thus need to be filtered.

Figures 3, 4:
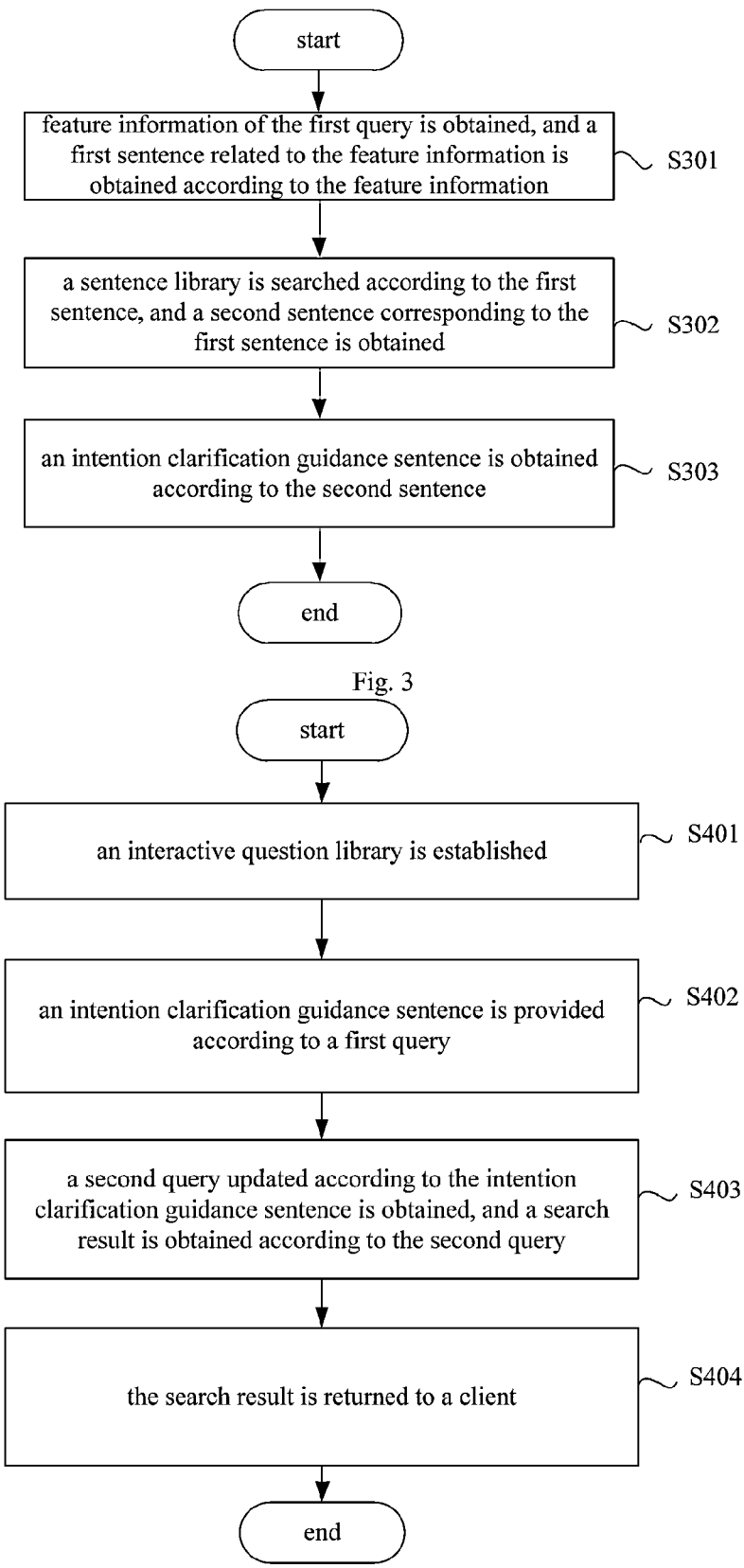
FIG. 3 is a flow chart showing obtaining an intention clarification guidance sentence according to the first query in an information searching method according to an embodiment of the present disclosure.
FIG. 4 is a flow chart showing an information searching method according to an embodiment of the present disclosure.

In some embodiments of the present disclosure, the user may input the first query in an input box provided by the search engine, after establishing the sentence library. Then, the search engine may search the sentence library according to the first query, thus obtaining the intention clarification guidance sentence. In some embodiments of the present disclosure, as shown in FIG. 3, obtaining an intention clarification guidance sentence according to the first query includes followings steps.

At step S301, feature information of the first query is obtained, and a first sentence related to the feature information is obtained according to the feature information.

In some embodiments of the present disclosure, the search engine may firstly obtain the feature information of the first query, and search an inverted index generated according to the feature information of all the first sentences in the sentence library, and match the feature information according to the inverted index, thus obtaining the first sentence related to the feature information.

In some embodiments of the present disclosure, the search engine may obtain the first sentence, if a semantic similarity between the first sentence and the first query is larger than a first preset threshold. In some embodiments of the present disclosure, the first sentence may be filtered, if the semantic similarity between the first sentence and the first query is smaller than the first preset threshold, i.e. the first sentence is irrelevant to the first query.

At step S302, a sentence library is searched according to the first sentence, and a second sentence corresponding to the first sentence is obtained.

In some embodiments of the present disclosure, the search engine may search the sentence library according to the first sentence after obtaining the first sentence, and obtain the second sentence corresponding to the first sentence. In some embodiments of the present disclosure, the first sentence may correspond to a plurality of second sentences, and therefore the second sentence(s) corresponding to the first sentence may be obtained by searching the sentence library.

In some embodiments of the present disclosure, the second sentence is obtained, if the first query excludes a keyword of a preset type of the second sentence. In some embodiments of the present disclosure, the second sentence is filtered, if the first query includes the keyword of the preset type of the second sentence, such as an interrogative "what".

In some embodiments of the present disclosure, the second sentence is obtained, if a semantic similarity between the first query and the second sentence is smaller than a second preset threshold. In some embodiments of the present disclosure, the second sentence is filtered, if the semantic similarity between the first query and the second sentence is larger than the second preset threshold, i.e. the first query and the second sentence belong to the same sentence type.

At step S303, an intention clarification guidance sentence is obtained according to the second sentence.

In some embodiments of the present disclosure, a plurality of second sentences are obtained according to second information related to the first information, and the search engine may sequence and cluster the second sentences after obtaining the second sentences corresponding to the first sentence.

In some embodiments of the present disclosure, the second sentences are sequenced according to $$score_{Qb} = \frac{\sum_{i=1}^{N} P_i}{N},$$

in which Qb represents the second sentence (Qbs correspond to the second sentences accordingly), $P_i$ represents a vote value of the $i^{th}$ tree and N represents a number of trees.

$$score_{Qb} = \frac{\sum_{i=1}^{N} P_i}{N}$$

is a random forest model formula for calculating the score of Qb (i.e. the second sentence), and the Qbs may be sequenced according to the scores, and then the search engine clusters the second sentences according to a semantic similarity.

In some embodiments of the present disclosure, the search engine clusters the second sentences having same or similar semantics to obtain a clustered second sentence (i.e. a species). For example, a sentence "how old is the baby" and another sentence "a baby at what age" have similar semantics and may be clustered. In some embodiments of the present disclosure, the clustering may be performed by at least one of K-means clustering algorithm (hard clustering algorithm) and hierarchical clustering algorithm.

Then, several clustered second sentences may be obtained, and the search engine sequences the clustered second sentences to obtain the intention clarification guidance sentence.

In some embodiments of the present disclosure, the scores of the clustered second sentences (i.e. the species) may be calculated according to $$score_c = (1 + \lambda|c|) * \frac{\sum_{Qb \in c} score_{Qb}}{|c|},$$

in which c represents a species, |c| represents a number of Qb in the species, λ represents a weight value of the species probability assessment, and 0<λ<1. In some embodiments of the present disclosure, after the scores of the clustered second sentences (i.e. the species) are calculated, the clustered second sentences (i.e. the species) are sequenced according to the scores, three intention clarification guidance sentences having the highest scores are obtained and returned to the client so as to show to the user, thereby enabling the user to update the first query according to the intention clarification guidance sentence. In the present embodiment, three intention clarification guidance sentences are provided only for example. In some embodiments of the present disclosure, one or more intention clarification guidance sentences may be obtained, without particular limits in the present disclosure.

With the information searching method according to embodiments of the present disclosure, the intention clarification guidance sentence is provided by the search engine, and the first query is updated according to the intention clarification guidance sentence, and the search result is provided according to the updated query such as the second query, such that the search intention of the user is clarified. Moreover, an accuracy of the search engine to identify the search intention of the user is increased and requirements of the user are satisfied, and in this way a user experience is improved.

FIG. 4 is a flow chart showing an information searching method according to an embodiment of the present disclosure. The information searching method includes the following steps.

At step S401, an interactive question library is established.

Figure 5:
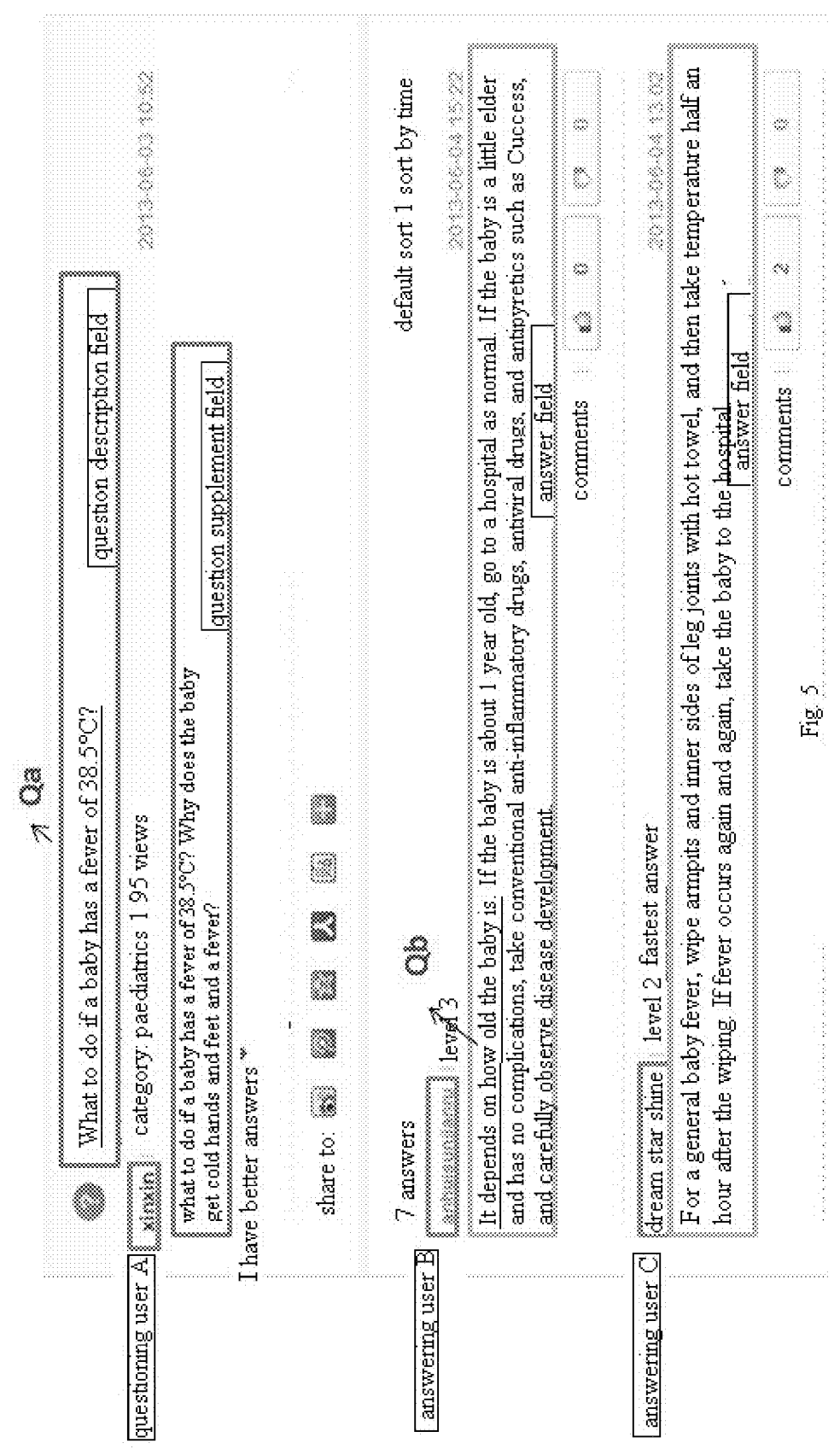

In some embodiments of the present disclosure, the search engine may establish an interactive question library by searching for the question in a community-based Q&A resource. The community-based Q&A resource may include various knowledge exchanging platforms, such as "Baidu Knows", "Search Ask", "Sina Iask" and so on. The community-based Q&A resource may a plurality of interactions on the same question. In some embodiments of the present disclosure, a question asked by a user is referred to as Qa, and an answer to the question Qa provided by another user is referred to as Qb. For example, as shown in FIG. 5, a user A asks a question Qa "what to do if a baby has a fever of 38.5° C.", and a user B provides an answer Qb "it depends on how old the baby is". The question Qa "what to do if a baby has a fever of 38.5° C." and the answer Qb "it depends on how old the baby is" may form an interactive sentence pair.

In some embodiments of the present disclosure, the search engine may establish the interactive sentence library by obtaining a plurality of interactive sentence pairs each consisting of Qa and Qb.

In some embodiments of the present disclosure, as shown in FIG. 5, a complete dialogue (such as a sentence pair) on one question mainly includes a question description field, a question supplement field, and an answer field. The question description field includes a main question point asked by the user, and generally is a brief and short question. The question supplement field includes additional information provided by the user to supplement and further describe the question asked by the user. The answer field includes answer(s) to this question provided by other users.

In some embodiments of the present disclosure, the search engine may punctuate the question description field and the answer field respectively, and detect whether the sentence(s) in the question description field and the answer field is an interrogative question according to the question dictionary and the question feature. If determining the sentence is an interrogative question, a Qa-Qb interactive sentence pair consisting of the sentence Qa in the question description field and the sentence Qb in the answer field is obtained.

Due to the freeness of the expression form of the questions and answers in the community-based Q&A resource, the sentence pair needs to be filtered to ensure the reasonability of the interactive sentence pair. In some embodiments of the present disclosure, the Qa-Qb interactive sentence pair may be filtered according to a filtering rule. In some embodiments of the present disclosure, the filtering rule includes: the core point of Qb is in the question supplement field, a semantic similarity between Qb and Qa is too large, the interrogative includes a descriptive interrogative such as "how" and "what to", and a ridicule Qb. As shown in Table 1, Qa is shown in the first column, Qb is shown in the second column, and reasons for filtering the Qa-Qb interactive sentence pair are shown in the third column.

TABLE 1

| Qa | Qb | Analysis |
| --- | --- | --- |
| Why a cell phone cannot connect to a computer system? | Which music software? | The question supplement field is "it is always unsuccessful to send songs in the computer to the cell phone by software", and therefore the core point of Qb is in the question supplement field instead of the question description field of Qa. |
| Interesting places to travel on October 1st | Which place is interesting on October 1st? | A semantic similarity between Qa and Qb is too large, and therefore Qb and Qa belong to a same question. |
| Japan travel route recommendations | How to reach Japan from Korea? | Qb has an interrogative of "how" and is not suitable for an interrogative question. |
| How did that QQ space get such a high click rate? | You wanna too? | Qb contains a ridiculous expression and is not suitable for an interrogative question. |

In some embodiments of the present disclosure, an interactive question library is established according to the filtered interactive sentence pair, after the Qa-Qb interactive sentence pair is filtered.

At step S402, an intention clarification guidance sentence is provided according to a first query.

In some embodiments of the present disclosure, the corresponding intention clarification guidance sentence is provided to the user according to a query input by the user, such as the first query.

In some embodiments of the present disclosure, after establishing the interactive question library, the search engine searches the interactive question library according to a query Q input by the user, obtains Qa-Qb interactive sentence pairs related to the query Q, sequences Qbs according to a machine learning model to ensure the relativity between Qb and Q, clusters Qbs according to a clustering algorithm to obtain several species, and sequences these species, thus obtaining the intention clarification guidance sentence.

In some embodiments of the present disclosure, an inverted index of the interactive question library is established according to Qa, the inverted index is searched according to the query Q, and the Qa-Qb interactive sentence pair related to the query Q is obtained. Then, the Qa-Qb interactive sentence pair is filtered according to a searching rule. In some embodiments of the present disclosure, the Qa-Qb interactive sentence pair is filtered, if the semantic similarity between Qa and Q is smaller than a preset threshold, i.e. the relativity between Qa and Q is not large. In some embodiments of the present disclosure, the Qa-Qb interactive sentence pair is filtered, if interrogatives of Q and Qb are same. In some embodiments of the present disclosure, the Qa-Qb interactive sentence pair is filtered, if the semantic similarity between Q and Qb is too large, i.e. Q and Qb belong to a same question.

In some embodiments of the present disclosure, the search engine sequences Qbs, after obtaining the Qa-Qb interactive sentence pair related to Q. In some embodiments of the present disclosure, the search engine obtains a feature from a knowledge base "Other information of Q-Qa-Qb-community-based Q&A resource" and sequences Qbs according to the feature. The feature may include at least one of: a semantic similarity between Qa and Q, a semantic similarity between Qb and Q, a distance between Qb and Qa in the interactions in the resource, the relativity between Qb and Q, a ratio of character number of Qa to character number of Qb, and an average probability of one Qb to occur in all Qbs.

In some embodiments of the present disclosure, the search engine calculates the score of Qbs by using a machine learning random forest model represented by $$score_{Qb} = \frac{\sum_{i=1}^{N} P_i}{N},$$

in which $P_i$ represents a vote value of the $i^{th}$ tree and N represents a number of trees, and every tree in the forest may vote a yes (1) or a no (0) on Qb.

In some embodiments of the present disclosure, the search engine may sequence Qbs according to the scores of Qbs. Then, the search engine may cluster Qbs with a same meaning (for example, "how old is the baby", "a baby at what age") according to the semantic similarity of Qbs by a clustering algorithm. The clustering algorithm may include at least one of K-means clustering algorithm and hierarchical clustering algorithm. After clustering Qbs, the scores of the clustered species may be calculated according to $$score_c = (1 + \lambda|c|) * \frac{\sum_{Qb \in c} score_{Qb}}{|c|},$$

in which c represents a species, |c| represents a number of Qb in the species, and λ represents a weight value of the species probability assessment, and 0<λ<1. Then, the clustered species may be sequenced according to the scores. In some embodiments of the present disclosure, optimum Qbs in three species having the largest scores (i.e. three intention clarification guidance sentences) are obtained. In the present embodiment, three intention clarification guidance sentences are provided only for example. In some embodiments of the present disclosure, one or more intention clarification guidance sentences may be obtained, without particular limits in the present disclosure.

At step S403, a second query updated according to the intention clarification guidance sentence is obtained, and a search result is obtained according to the second query.

In some embodiments of the present disclosure, after obtaining the intention clarification guidance sentence, the search engine may update the first query to obtain the second query according to the intention clarification guidance sentence, and obtain the search result according to the second query. In some embodiments of the present disclosure, the search engine may display the intention clarification guidance sentence to the user via a client, the client inputs the second query updated according to the intention clarification guidance sentence in an input box of the search engine, and the search engine searches according to the second query and obtains the search result.

At step S404, the search result is returned to a client.

In some embodiments of the present disclosure, after obtaining the search result, the search engine may return the search result to the client, such that the search result may be displayed to the user. The user may obtain a resource that he or she needs according to the displayed search result.

FIG. 6(a) shows the effect of obtaining the intention clarification guidance sentence, and FIG. 6(b) shows the effect of obtaining the search result based on the second query updated according to the intention clarification guidance sentence. In some embodiments of the present disclosure, as shown in FIGS. 6(a) and 6(b), the user inputs a query "exit visa", the intention clarification guidance sentences including "which country will you go to" and "do you want a visa for travel, to study abroad, or of other types" provided by the search engine are obtained, and then the user inputs an updated query "visa for travel to England" and searches. In this way, the search result returned by the search engine may better satisfy the requirements of the user.

With the information searching method according to embodiments of the present disclosure, the intention clarification guidance sentence is provided by the search engine, and the first query is updated according to the intention clarification guidance sentence, and the search result is provided according to the updated query such as the second query, such that the search intention of the user is clarified. Moreover, an accuracy of the search engine to identify the search intention of the user is increased and requirements of the user are satisfied, and in this way a user experience is improved.

Embodiments of another aspect of the present disclosure further provide an information searching device. The information searching device can include a plurality of modules that may be executed by one or more computing devices.

Figure 7:
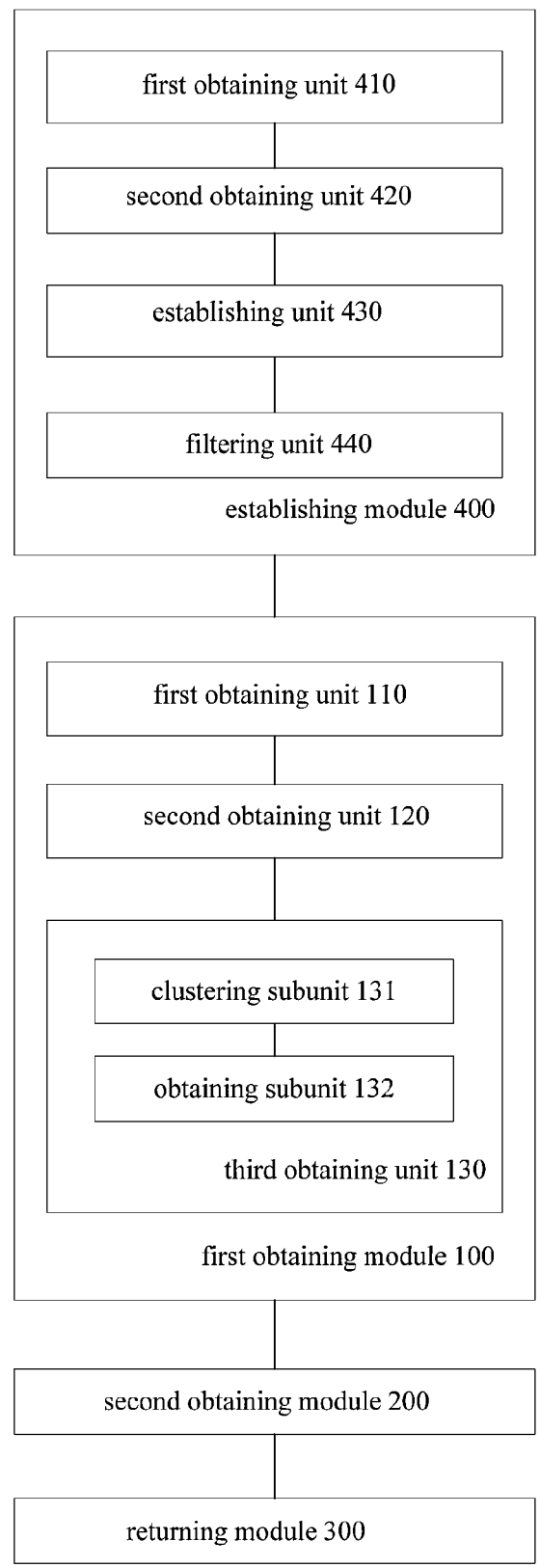
FIG. 7 is a block diagram of an information searching device according to an embodiment of the present disclosure.

FIG. 7 is a block diagram of an information searching device according to an embodiment of the present disclosure. As shown in FIG. 7, the information searching device includes a first obtaining module 100, a second obtaining module 200, a returning module 300 and an establishing module 400. In some embodiments of the present disclosure, the first obtaining module 100 includes a first obtaining unit 110, a second obtaining unit 120 and a third obtaining unit 130. In some embodiments of the present disclosure, the third obtaining unit 130 includes a clustering subunit 131 and an obtaining subunit 132. In some embodiments of the present disclosure, the establishing module 400 includes a first obtaining unit 410, a second obtaining unit 420, an establishing unit 430 and a filtering unit 440.

In some embodiments of the present disclosure, the first obtaining module 100 is configured to receive a first query and to obtain an intention clarification guidance sentence according to the first query. The first query may include a term or a sentence.

In some embodiments of the present disclosure, the first obtaining module 100 includes a first obtaining unit 110, a second obtaining unit 120 and a third obtaining unit 130.

In some embodiments of the present disclosure, the first obtaining unit 110 is configured to obtain feature information of the first query and to obtain a first sentence related to the feature information according to the feature information.

In some embodiments of the present disclosure, the first obtaining unit 110 may obtain feature information of the first query, search an inverted index generated according to the feature information of all the first sentences in a sentence library, perform a match for the feature information according to the inverted index, and therefore the first sentence related to the feature information is obtained.

In some embodiments of the present disclosure, the first obtaining unit 110 obtains the first sentence, if a semantic similarity between the first sentence and the first query is larger than a first preset threshold. In some embodiments of the present disclosure, the first sentence is filtered, if the semantic similarity between the first sentence and the first query is smaller than the first preset threshold, i.e. the first sentence is irrelative with the first query.

In some embodiments of the present disclosure, the second obtaining unit 120 is configured to search the sentence library according to the first sentence and to obtain the second sentence corresponding to the first sentence.

In some embodiments of the present disclosure, after the first obtaining unit 110 obtains the first sentence, the second obtaining unit 120 searches the sentence library according to the first sentence, and obtains the second sentence corresponding to the first sentence. The first sentence related to the feature information may correspond to a plurality of second sentences, and therefore the second obtaining unit 120 may obtain the second sentence corresponding to the first sentence by searching the sentence library.

In some embodiments of the present disclosure, the second obtaining unit 120 obtains the second sentence, if the first query excludes a keyword of a preset type of the second sentence. In some embodiments of the present disclosure, the second sentence is filtered, if the first query includes the keyword of the preset type of the second sentence, such as an interrogative "what".

In some embodiments of the present disclosure, the second obtaining unit 120 obtains the second sentence, if a semantic similarity between the first query and the second sentence is smaller than a second preset threshold. In some embodiments of the present disclosure, the second sentence is filtered, if the semantic similarity between the first query and the second sentence is larger than the second preset threshold, i.e. the first query and the second sentence belong to the same sentence type.

In some embodiments of the present disclosure, the third obtaining unit 130 is configured to obtain the intention clarification guidance sentence according to the second sentence. The third obtaining unit 130 may include a clustering subunit 131 and an obtaining subunit 132. In some embodiments, the second obtaining unit 120 is configured to search the sentence library according to the first sentence and to obtain a plurality of second sentences corresponding to the first sentence, and the clustering subunit 131 is configured to sequence and cluster the second sentences to obtain clustered second sentences.

In some embodiments of the present disclosure, the clustering subunit 131 sequences the second sentences according to $$score_{Qb} = \frac{\sum_{i=1}^{N} p_i}{N},$$

in which Qb represents the second sentence, $P_i$ represents a vote value of the $i^{th}$ tree and N represents a number of trees.

$$score_{Qb} = \frac{\sum_{i=1}^{N} p_i}{N}$$

is a random forest model formula for calculating the scores of Qbs (i.e. the second sentences). Then, the clustering subunit 131 clusters the second sentences according to a semantic similarity. For example, a sentence "how old is the baby" and another sentence "a baby at what age" have similar semantics and may be clustered. In some embodiments of the present disclosure, the clustering may be performed by at least one of K-means clustering algorithm (hard clustering algorithm) and hierarchical clustering algorithm.

In some embodiments of the present disclosure, the obtaining subunit 132 is configured to sequence the clustered second sentences and to obtain the intention clarification guidance sentence.

In some embodiments of the present disclosure, the obtaining subunit 132 may calculate the scores of the clustered second sentences (i.e. the species) according to $$score_c = (1 + \lambda |c|) * \frac{\sum_{Qb \in c} score_{Qb}}{|c|},$$

in which c represents a species, |c| represent a number of Qb in the species, $\lambda$ represents a weight value of the species probability assessment, and $0 < \lambda < 1$. In some embodiments of the present disclosure, after the scores of the clustered second sentences (i.e. the species) are calculated, the clustered second sentences (i.e. the species) are sequenced according to the scores, three intention clarification guidance sentences having the highest scores are obtained and returned to the client so as to show to the user, thereby enabling the user to update the first query according to the intention clarification guidance sentence. In the present embodiment, three intention clarification guidance sentences are provided only for example. In some embodiments of the present disclosure, one or more intention clarification guidance sentences may be obtained, without particular limits in the present disclosure.

In some embodiments of the present disclosure, the second obtaining module 200 is configured to obtain a second query updated according to the intention clarification guidance sentence, and to obtain a search result according to the second query.

In some embodiments of the present disclosure, the second obtaining module 200 may obtain the second query updated according to the intention clarification guidance sentence and obtain the search result according to the second query. For example, the search engine may display the intention clarification guidance sentence to the user via a client, and the user may input an updated query (for example, the second query) in an input box provided by the search engine, and then the search engine may search according to the updated query and obtain a search result.

In some embodiments of the present disclosure, the returning module 300 is configured to return the search result to a client.

In some embodiments of the present disclosure, after the second obtaining module 200 obtains the search result, the returning module 300 may return the search result to the client and display the search result to the user. The user may obtain resources he or she needs based on the displayed search result.

In some embodiments of the present disclosure, the establishing module 400 is configured to establish a sentence library.

In some embodiments of the present disclosure, before the intention clarification guidance sentence is obtained, the establishing module 400 may establish a sentence library, such that the search engine may search the sentence library to obtain the intention clarification guidance sentence. In some embodiments of the present disclosure, a sentence library may be pre-established, and therefore the step of establishing the sentence library may be avoided.

In some embodiments of the present disclosure, the establishing module 400 includes a first obtaining unit 410, a second obtaining unit 420, an establishing unit 430 and a filtering unit 440.

In some embodiments of the present disclosure, the first obtaining unit 410 is configured to obtain a first sentence according to first information.

In some embodiments of the present disclosure, the first obtaining unit 410 may divide the first information, and detect whether the first information belongs to a preset sentence type according to a preset feature. If the first information belongs to the preset sentence type, the first obtaining unit 410 obtains the first sentence according to the first information. In some embodiments of the present disclosure, the first information may include sentences in a knowledge exchanging platform of community users, the preset sentence type may include various sentences such as interrogative questions, affirmative sentences and rhetorical questions, and the preset feature may include an interrogative dictionary or a question feature.

In some embodiments of the present disclosure, the second obtaining unit 420 is configured to obtain a second sentence according to second information related to the first information.

In some embodiments of the present disclosure, the second obtaining unit 420 may divide the second information, and detect whether the second information belongs to a preset sentence type according to a preset feature. If the second information belongs to the preset sentence type, the second obtaining unit 420 obtains the second sentence according to the second information, in which the second information is related to the first information.

In some embodiments of the present disclosure, the establishing unit 430 is configured to establish at least one sentence pair in the sentence library according to the first sentence and the second sentence.

In some embodiments of the present disclosure, the establishing unit 430 may establish at least one sentence pair according to the first and second sentences after the first and second sentences are obtained, and store the sentence pair in the sentence library so as to establish or expand the sentence library.

In some embodiments of the present disclosure, the search engine may search resources in the knowledge exchanging platform of community users, which resources include a plurality of questions (the first information) provided by users and answers (the second information) to these questions provided by other users. After it is determined that both the questions and answers belong to the preset sentence type, the establishing unit 430 may obtain a sentence pair consisting of at least one question (the first sentence) and a corresponding answer (the second sentence), thus establishing the sentence library. For example, a user asks a question "what to do if a baby has a fever of 38.5° C." in "Baidu Knows", and another user provides an answer "it depends on how old the baby is". The establishing unit 430 may obtain a sentence pair consisting of this question and this answer and store the sentence pair in the sentence library, thus establishing or expanding the sentence library.

In some embodiments of the present disclosure, the filtering unit 440 is configured to filter the sentence pair in the sentence library.

In some embodiments of the present disclosure, the filtering unit 440 may filter the sentence pair in the sentence library, after the establishing unit 430 establishes the at least one sentence pair in the sentence library. In some embodiments of the present disclosure, the filtering unit 440 filters the second sentence in the sentence library according to a preset filtering rule. For example, a first sentence "interesting places to travel on October 1st" and a second sentence "which place is interesting on October 1st" have similar semantics and belong to a same question, and thus need to be filtered.

With the information searching device according to embodiments of the present disclosure, the intention clarification guidance sentence provided by the search engine is obtained, and the first query is updated according to the intention clarification guidance sentence, and the search result is provided according to the updated query such as the second query, such that the search intention of the user is clarified. Moreover, an accuracy of the search engine to identify the search intention of the user is increased and requirements of the user are satisfied, and in this way a user experience is improved.

Embodiments of a third aspect of the present disclosure provide a non-transitory computer readable storage medium. The computer readable storage medium includes a computer program for executing the information searching method according to embodiments of the first aspect of the present disclosure, when running on a computer.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electronic manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented information searching method, comprising:
    receiving, at one or more computing devices, a first query from a client device;
    establishing, at one or more computing devices, a sentence library;
    obtaining, at the one or more computing devices, an intention clarification guidance sentence by searching the sentence library according to the first query;
    receiving a second query updated according to the intention clarification guidance sentence;
    obtaining a search result according to the second query; and
    returning the search result to the client device;
    wherein establishing a sentence library comprises:
        obtaining, at one or more computing devices, a first sentence according to first information;
        obtaining, at one or more computing devices, a second sentence according to second information related to the first information; and
        establishing, at one or more computing devices, at least one sentence pair in the sentence library according to the first sentence and the second sentences;
    wherein obtaining the intention clarification guidance sentence by searching the sentence library according to the first query comprises:
        obtaining, at one or more computing devices, a first feature sentence related to the feature information according to the feature information, if determining that a semantic similarity between the first feature sentence and the first query is larger than a first preset threshold; and
        obtaining, at one or more computing devices, a second feature sentence corresponding to the first feature sentence, if:
            (1) determining that the first query excludes a keyword of a preset type of the second feature sentence; or
            (2) determining that a semantic similarity between the first query and the second feature sentence is smaller than a second preset threshold.

2. The method according to claim 1, further comprising:
    filtering, at one or more computing devices, the sentence pair in the sentence library.

3. The method according to claim 1, wherein obtaining an intention clarification guidance sentence according to the first query further comprises:
    obtaining, at one or more computing devices, feature information of the first query;
    searching, at one or more computing devices, the sentence library according to the first feature sentence; and
    obtaining, at one or more computing devices, the intention clarification guidance sentence according to the second feature sentence.

4. The method according to claim 3, wherein
    obtaining a second sentence according to second information related to the first information comprises:
        obtaining, at one or more computing devices, a plurality of second sentences according to the second information related to the first information,
    wherein obtaining the intention clarification guidance sentence according to the second sentence comprises:
        sequencing, at one or more computing devices, the second sentences to obtain clustered second sentences; and
        sequencing, at one or more computing devices, the clustered second sentences to obtain the intention clarification guidance sentence.

5. The method according to claim 4, wherein sequencing and clustering the second sentences to obtain clustered second sentences comprises:
    sequencing, at one or more computing devices, the second sentences according to $$score_{Qb} = \frac{\sum_{i=1}^{N} p_i}{N},$$

and
    clustering, at one or more computing devices, the second sentences according to a semantic similarity, in which Qb represents the second sentence, $P_i$ represents a vote value of the $i^{th}$ tree and N represents a number of trees.

6. The method according to claim 1, wherein obtaining a first sentence according to first information comprises:
    dividing, at one or more computing devices, the first information;
    detecting, at one or more computing devices, whether the first information belongs to a preset sentence type according to a preset language model; and
    obtaining, at one or more computing devices, the first sentence according to the first information, if it is determined that the first information belongs to the preset sentence type.

7. The method according to claim 1, wherein obtaining a second sentence according to second information related to the first information comprises:
    dividing, at one or more computing devices, the second information;

detecting, at one or more computing devices, whether the second information belongs to a preset sentence type according to a preset feature; and obtaining, at one or more computing devices, the second sentence according to the second information, if it is determined the second information belongs to the preset sentence type.

8. An information searching device, comprising:
one or more computing devices configured to execute one or more software modules, the one or more software modules including:
an establishing module configured to establish a sentence library;
a first obtaining module configured to receive a first query and to obtain an intention clarification guidance sentence by searching the sentence library according to the first query;
a second obtaining module configured to receive a second query updated according to the intention clarification guidance sentence, and to obtain a search result according to the second query; and
a returning module configured to return the search result;
wherein the first obtaining module comprises:
a first feature obtaining unit configured to obtain feature information of the first query and to obtain a first feature sentence related to the feature information according to the feature information, if determining that a semantic similarity between the first feature sentence and the first query is larger than a first preset threshold; and
a second feature obtaining unit configured to search the sentence library according to the first feature sentence and to obtain a second feature sentence corresponding to the first feature sentence, if:
(1) determining that the first query excludes a keyword of a preset type of the second feature sentence, or
(2) determining that a semantic similarity between the first query and the second feature sentence is smaller than a second preset threshold; and
wherein the establishing module is further configured to comprise:
a first obtaining unit configured to obtain a first sentence according to first information;
a second obtaining unit configured to obtain a second sentence according to second information related to the first information; and
an establishing unit configured to establish at least one sentence pair in the sentence library according to the first sentence and the second sentence.

9. The device according to claim 8, wherein the establishing module comprises:
a filtering unit configured to filter the sentence pair in the sentence library.

10. The device according to claim 8, wherein the first obtaining module further comprises:
a third obtaining unit configured to obtain the intention clarification guidance sentence according to the second feature sentence.

11. The device according to claim 10, wherein the second obtaining unit is further configured to obtain a plurality of second sentences according to second information related to the first information; and the third obtaining unit comprises:
a clustering subunit configured to sequence and cluster the second sentences to obtain clustered second sentences; and an obtaining subunit configured to sequence the clustered second sentences to obtain the intention clarification guidance sentence.

12. The device according to claim 11, wherein the clustering subunit is further configured to sequence the second sentences according to $$score_{Qb} = \frac{\sum_{i=1}^{N} p_i}{N}$$

and to cluster the second sentences according to a semantic similarity, in which Qb represents the second sentence, $P_i$ represents a vote value of the $i^{th}$ tree and N represents a number of trees.

13. The device according to claim 8, wherein the first obtaining unit is further configured to divide the first information, to detect whether the first information belongs to a preset sentence type according to a preset language model, and to obtain the first sentence according to the first information if it is determined that the first information belongs to the preset sentence type.

14. The device according to claim 8, wherein the second obtaining unit is further configured to divide the second information, to detect whether the second information belongs to a preset sentence type according to a preset feature, and to obtain the second sentence according to the second information if it is determined the second information belongs to the preset sentence type.

15. A non-transitory computer readable storage medium, comprising a computer program configured to execute the following steps on one or more computing devices:
receiving a first query from a client device;
establishing a sentence library;
obtaining an intention clarification guidance sentence by searching the sentence library according to the first query;
receiving a second query updated according to the intention clarification guidance sentence;
obtaining a search result according to the second query; and
returning the search result to the client device;
wherein establishing a sentence library comprises:
obtaining, at one or more computing devices, a first sentence according to first information;
obtaining, at one or more computing devices, a second sentence according to second information related to the first information; and
establishing, at one or more computing devices, at least one sentence pair in the sentence library according to the first sentence and the second sentence; and
wherein obtaining the intention clarification guidance sentence by searching the sentence library according to the first query comprises:
obtaining, at one or more computing devices, a first feature sentence related to the feature information according to the feature information, if determining that a semantic similarity between the first feature sentence and the first query is larger than a first preset threshold; and
obtaining, at one or more computing devices, a second feature sentence corresponding to the first feature sentence, if:
(1) determining that the first query excludes a keyword of a preset type of the second feature sentence; or (2) determining that a semantic similarity between the first query and the second feature sentence is smaller than a second preset threshold.

\* \* \* \* \*